(12) United States Patent
Steiner et al.

(10) Patent No.: US 11,260,573 B2
(45) Date of Patent: Mar. 1, 2022

(54) APPARATUS FOR HEATING PLASTIC PARISONS WITH A SHIELDING PANEL

(71) Applicant: KRONES AG, Neutraubling (DE)

(72) Inventors: Andreas Steiner, Wenzenbach (DE); Roland Reiner, Arrach (DE)

(73) Assignee: KRONES AG, Neutraubling (DE)

( * ) Notice: Subject to any disclaimer, the term of this patent is extended or adjusted under 35 U.S.C. 154(b) by 291 days.

(21) Appl. No.: 16/347,667

(22) PCT Filed: Nov. 13, 2017

(86) PCT No.: PCT/EP2017/079035
§ 371 (c)(1),
(2) Date: May 6, 2019

(87) PCT Pub. No.: WO2018/087360
PCT Pub. Date: May 17, 2018

(65) Prior Publication Data
US 2019/0315043 A1      Oct. 17, 2019

(30) Foreign Application Priority Data

Nov. 11, 2016   (DE) .................... 10 2016 121 685.2

(51) Int. Cl.
*B29C 49/64*   (2006.01)
*B29C 35/02*   (2006.01)
*B29C 49/02*   (2006.01)

(52) U.S. Cl.
CPC .......... *B29C 49/64* (2013.01); *B29C 35/0277* (2013.01); *B29C 49/02* (2013.01); *B29C 2035/0283* (2013.01)

(58) Field of Classification Search
CPC ...... B29C 49/64; B29C 49/02; B29C 35/0277; B29C 2035/0283
See application file for complete search history.

(56) References Cited

U.S. PATENT DOCUMENTS 4,572,355 A * 2/1986 Hunter ................ B29C 49/4205
198/803.12
5,066,222 A   11/1991 Roos et al.
(Continued)

FOREIGN PATENT DOCUMENTS

AT              520 U1    12/1995
CN      108602233 A       9/2018
(Continued)

OTHER PUBLICATIONS

Third Party Observation for Application No. EP20170818046 dated Jul. 7, 2020.
(Continued)

*Primary Examiner* — Jacob T Minskey
*Assistant Examiner* — Virak Nguon
(74) *Attorney, Agent, or Firm* — Schmeiser, Olsen & Watts, LLP

(57) ABSTRACT

Provided is an apparatus for heating plastic parisons, including a transport device or transporter, which transports the plastic parisons at least in sections along a predefined transport path, wherein the transport device or transporter has a plurality of holding devices or holders for holding the plastic parisons, with a heating device or heaters for heating the plastic parisons at least at times, while they are being transported by the transport device or transporters, wherein the apparatus has at least one heat shielding device or heat shield which is suitable and intended to counteract the heating of mouth regions of the plastic parisons.

16 Claims, 3 Drawing Sheets

(56) References Cited

U.S. PATENT DOCUMENTS

| | | |
|---|---|---|
| 7,121,821 B2 | 10/2006 | Pickel |
| 2012/0153524 A1 | 6/2012 | Blochmann et al. |
| 2019/0047206 A1* | 2/2019 | Meyer ................. B29C 49/6409 |
| 2019/0176385 A1* | 6/2019 | Hayakawa .......... B29C 49/6418 |

FOREIGN PATENT DOCUMENTS

| | | |
|---|---|---|
| DE | 202008008755 U1 | 9/2008 |
| EP | 2465663 A2 | 6/2012 |
| FR | 2950284 A1 | 3/2011 |
| FR | 2950284 B1 † | 10/2013 |
| WO | 0048819 A1 | 8/2000 |
| WO | 2005/068329 A1 | 7/2005 |
| WO | 2015/181738 A1 | 12/2015 |
| WO | 2017/140660 A1 | 8/2017 |

OTHER PUBLICATIONS

International Search Report for PCT/EP2017/079035.
International Search Report dated May 4, 2018 for International Application No. PCT/EP2017/079035.
Chinese Office Action dated Jul. 15, 2021 for Application No. 201780069651.8.

\* cited by examiner
† cited by third party

APPARATUS FOR HEATING PLASTIC PARISONS WITH A SHIELDING PANEL

CROSS-REFERENCE TO RELATED APPLICATIONS

This application claims priority to PCT Application No. PCT/EP2017/079035, having a filing date of Nov. 13, 2017, based on German Application No. 10 2016 121 685.2, having a filing date of Nov. 11, 2016, the entire contents both of which are hereby incorporated by reference.

FIELD OF TECHNOLOGY

The following relates to an apparatus and a method for heating plastic parisons. It is known that plastic parisons are transformed, for example stretch blow moulded, to form plastic containers. For this purpose, the plastic parisons are first of all heated and then are delivered in a heated state into the actual transforming device. For heating of the plastic parisons, in the known art in some instances microwave ovens are used, but usually infrared ovens are also used.

BACKGROUND

The plastic parisons are conveyed in an upright position through these ovens, so that the main bodies of the plastic parisons are heated for the later stretching process. However, the plastic parisons also have thread regions which should not be heated. Without corresponding devices an excessive heating of the thread regions could occur, which in turn is detrimental for the further processing.

Therefore, shielding panels which are usually installed on the holders, and which should prevent an excessive heating of precisely the thread regions and in particular the carrying rings, are known from the known art. In the known art the plastic parisons are usually gripped and conveyed through openings in these shielding panels or are moved inside them. However, in the known art this means that these shielding panels must in any case have a larger cross-section than the largest cross-section of the plastic parisons which is usually located in a region of the carrying ring of the plastic parisons. In this way comparatively, large gaps are produced between the plastic parisons and the respective shielding panels, through which heat can nevertheless pass.

In other words, in the known art the light gap which exists between the shielding panel and the carrying ring of the plastic parisons still leads to a certain overheating of the carrying ring. In the subsequent processing for example by a blow moulding machine, this can in turn lead to problems with an imprint of the blow nozzle which can occur in the carrying ring.

SUMMARY

An aspect relates to an improved shielding against heat, which also protects the carrying ring and/or the thread of the plastic parisons in a better way than is achieved in the known art. This aspect is achieved according to embodiments of the invention. Advantageous embodiments and further developments form the subject matter of the subordinate claims.

An apparatus according to embodiments of the invention for heating plastic parisons has a transport device or transporter which transports the plastic parisons at least in sections along a predetermined transport path. In this case this transport device or transporter has a plurality of holding devices or holders for holding the plastic parisons. Furthermore, the apparatus has a heating device or heater in order to heat the plastic parisons at least at times while they are being transported by the transport device or transporter, wherein the apparatus has at least one heat shielding device or heat shield which is suitable and intended to counteract heating of the mouth regions of the plastic parisons.

According to embodiments of the invention, the heat shielding devices or heat shields have at least one first heat shielding element and a second heat shielding element, which can be moved relative to one another and which, in at least one relative position with respect to one another, surround a portion of a plastic parison to be heated at least partially and substantially in the circumferential direction thereof. The heat shielding devices or heat shields also in each case have a first heat shielding element and a second heat shielding element.

In contrast to the heat shielding panels according to the known art, which are constructed in one piece, within the context of embodiments of the invention it is proposed that they are constructed in two parts and are movable with respect to one another. In this way it is possible for these shielding elements to be advanced more precisely or nearer to the plastic parisons and in this way also to reduce the occurrence of light gaps between the plastic parison and the cross-section of the shielding panel. In this way an unwanted heating of the mouth regions of the plastic parisons can also be reduced.

Within the context of embodiments of the present invention a heat shielding device or heat shield is understood in particular to be a device which is suitable and intended for at last partially interrupting a flow of heat proceeding in the direction of the mouths of the plastic parisons.

Substantially surrounding or also mainly surrounding the plastic parisons is understood to mean surrounding them by at least 160°, by at least 180°, by at least 200°, by at least 220°, by at least 240°, by at least 260°, by at least 280°, by at least 300°, by at least 320° and by at least 340° and by at least 350°. In this case it is possible that the two shielding elements jointly surround the plastic parison completely or except for a gap which is at all events small. Advantageously the two shielding elements form a hole or in particular an at least partially circular hole, which in particular is adapted to the external contour of the plastic parison, so that a gap between the plastic parison and the two shielding elements is small.

In further advantageous embodiments, a plurality of heating elements are arranged laterally adjacent to the transport path of the plastic parisons. These heating elements are arranged in particular in a region in which the plastic parisons are conveyed in a straight line.

In a further advantageous embodiment at least one shielding element and both shielding elements can be advanced towards the plastic parisons by a movement which takes place perpendicularly to a longitudinal axis of the plastic parison. The shielding elements can advantageously be advanced towards the plastic parisons below a carrying ring thereof. This means that the carrying ring of the plastic parison itself is no longer heated. In this case the shielding elements are moved in a horizontal direction.

In further advantageous embodiments, a moving device or mover is provided which can advance the shielding elements laterally or with a movement component perpendicular to the longitudinal direction of the plastic parison. Particularly, however, the advancing movement takes place by a transport chain or another circulating transport means or transporter (such as for instance a belt) on which the shielding elements are arranged. In this case it is conceivable that with a rectilinear configuration of this transport means or transporter the individual shielding elements are also advanced towards one another, and with a curved configuration (for instance around a deflecting wheel) the individual shielding elements move apart. However, advancing of the shielding elements by a separate drive would also be conceivable. In this case it would also be conceivable that this moving device or generally a moving device from a group of moving devices is selected, which contains guide cams, electrical moving devices, pneumatic moving devices and hydraulic moving devices.

In an advantageous embodiment these holding devices or holders have mandrels which can be introduced into mouths of the plastic parisons. The plastic parisons are held on these mandrels. These holding devices or holders are advantageously active holding devices or holders which can activate and deactivate a grip of the plastic parisons.

In a further advantageous embodiment these mandrels are configured to be rotatable, so that during the heating of the plastic parisons a rotation thereof with respect to their longitudinal direction is possible.

In a further advantageous embodiment at least one and precisely one or precisely two heat shielding element(s) is (are) associated with each holding device. Advantageously, it is also possible that receiving segments of two adjacent heat shielding elements are associated with each holding device. Advantageously, receiving segments of two adjacent heat shielding elements are also associated with each plastic parison. In further advantageous embodiments, the transport device or transporter has a circulating transport means or transporter and in particular a circulating transport chain. The holding devices or holders for holding the plastic parisons can also be arranged on this transport chain and, furthermore, also the shielding elements are arranged on this circulating transport means or transporter. Each plastic parison (or the thread region thereof) is shielded by precisely two successive shielding elements.

In further advantageous embodiments, it is possible that the shielding devices are arranged on the same holding device as the previously mentioned gripping elements or the previously mentioned mandrels. In this case it would be conceivable that at least one or also both heat shielding elements, that is to say either the first or the second or also both heat shielding elements, are arranged on the same holding device as the mandrels. Thus, it would be possible that both the holding device for holding the plastic parisons and also the shielding device are arranged on the transport chain by means of the same holding device. At least one shielding device is arranged on the same holding device as the gripping elements, several shielding devices are arranged on the same holding devices or holders as the gripping elements and particularly all shielding devices are arranged on the same holding devices or holders as the gripping elements.

In further advantageous embodiments, a transport path along which the plastic parisons are moved is at least in some sections curved and also rectilinear in some sections. The shielding devices are configured in such a way that they are closed in a rectilinear section of the transport path and plastic parisons are located in the shielding elements in a heated state.

Adjacent shielding elements are separated from one another in the curved regions of the transport path.

The plastic parisons are fed in a curved section of the transport path of the plastic parisons. Removal of the plastic parisons also takes place in a curved section. Both the feeding and also the removal of the plastic parisons take place in the same curved section of the transport path. In further advantageous embodiments, the shielding elements are also arranged on the transport device or transporter.

In further advantageous embodiments, the heat shielding elements have a plate-like construction. In this case it is possible that these plates are advanced towards the plastic parisons below the carrying rings thereof.

In a further advantageous embodiment at least one heat shielding element has a first recess to receive at least one section of the plastic parison.

In a further advantageous embodiment at least one heat shielding element and the heat shielding elements is or are made from a reflecting material (in particular a (thermal) radiation-reflecting and/or heat-reflecting material).

In a further advantageous embodiment at least one heat shielding element and the heat shielding elements is or are made from a material which is suitable and intended for absorbing IR radiation. Particularly at least one heat shielding element and the heat shielding elements are produced from an aluminium alloy such as for example stainless steel. Alternatively, or in addition it would also be possible that a polished material is used as a material for the heat shielding element or elements.

This recess is particularly a depression into which a portion of the plastic parison and in particular a portion of the main body thereof can enter. In this case this depression advantageously has a profile in the form of a circular segment. In this way the plastic parison can reach very close to the respective depression or the heat shielding element can be advanced very close to the plastic parison. Particularly, a radius of curvature of this recess is adapted to an external circumference of the plastic parison to be heated. In this case it is possible for this radius of curvature to be slightly greater than a corresponding radius of curvature of the plastic parison, so that nevertheless the shielding element can be advanced very close to the plastic parison.

In further advantageous embodiments, at least one shielding element has a second recess to receive a portion of the plastic parison or a further plastic parison. In this embodiment at least one shielding element has two such recesses. Advantageously, these two recesses are arranged in the transport direction or along the transport path of the plastic parisons on mutually opposing sides. In this case it is possible that the first receiving device receives regions of a first plastic parison and the second receiving recess receives regions of a second plastic parison which in particular are transported adjacent to one another or one behind the other. Therefore, portions of two successive plastic parisons are shielded by a specific shielding element.

In further advantageous embodiments, the first recess of the first shielding element and the second recess of the second shielding element are constructed in such a way that they co-operate at least at times in order to substantially surround a portion of the plastic parison in the circumferential direction thereof. In this embodiment it is proposed in particular that two adjacent shielding elements are advanced towards one another in such a way that they surround the plastic parison during heating thereof.

In an advantageous embodiment at least one shielding element has a first recess to receive a portion of a first plastic parison, as well as a second recess to receive a portion of a second plastic parison. These are advantageously plastic parisons which are transported adjacent to one another.

In a further advantageous embodiment at least two heat shielding elements have the same construction. In particular the two heat shielding elements have the same geometric configuration. In particular two shielding elements which co-operate to surround the same plastic parison have the same construction. Advantageously, two successive shielding elements in a transport direction or along the transport path have the same construction. In a further advantageous embodiment all the shielding elements have the same construction.

In a further advantageous embodiment at least one of the recesses is suitable to surround the plastic parison in the circumferential direction thereof at an angle which is greater than 70°, greater than 90°, greater than 120°, greater than 140°, greater than 150°, greater than 160° and particularly greater than 170°. Alternatively, or in addition, at least one recess is suitable to surround the plastic parison in the circumferential direction thereof at an angle which is less than 270°, less than 250°, preferably less than 230°, less than 210°, less than 200°, and particularly less than 190°.

In a further advantageous embodiment, in a state in which the recesses surround a plastic parison, an area surrounded by these recesses is smaller than or equal to the cross-section of a carrying ring of this plastic parison. Due to these area dimensions or also due to this specific configuration of the respective shielding elements a gap between the plastic parison and the shielding element can be efficiently reduced in size.

Furthermore, embodiments of the present invention are directed to a shielding element for shielding heat from plastic parisons being transported upright. This shielding element has a holding device in order to fasten the shielding element at least indirectly to a transport device or transporter for transporting plastic parisons, as well as a first recess which is suitable and intended to receive at least a portion of a first plastic parison, wherein this recess extends over a circumferential angle of less than 180°. According to embodiments of the invention the shielding element has a second recess which is suitable and intended to receive at least a portion of a second plastic parison, wherein this second recess extends over a circumferential angle of less than 180°. Thus, a shielding element is proposed which is suitable and intended to receive two plastic parisons and in particular two successive plastic parisons.

Advantageously the shielding element has a plate-shaped portion which can be inserted below the carrying ring of the plastic parisons.

In a further preferred embodiment at least one recess has a profile in the form of a circular segment. Both recesses, considered together, has an angle of more than 160°, more than 180°, more than 200°, more than 220° and particularly more than 240° and particularly more than 260° and particularly more than 300°. In further preferred embodiments, the two recesses point in mutually opposing directions. These two recesses are spaced apart from one another. In further advantageous embodiments, the holding device has at least one (and two) rod-like body or bodies, which is (are) arranged, for example screwed, on the shielding panel (which has the recesses). This rod-like body is arranged between the two recesses.

Furthermore, embodiments of the present invention are directed to a method for heating plastic parisons, wherein the plastic parisons are transported by means of a transport device or transporter along a predetermined transport path and are heated at least at times during this transport. Furthermore, a heating of mouth regions of the plastic parisons is counteracted by means of heat shielding devices or heat shields.

In this case according to embodiments of the invention, the heat shielding device or heat shields have at least one first heat shielding element and a second heat shielding element, which can be moved relative to one another and which, in at least one relative position with respect to one another, surround a portion of the plastic parison at least partially and substantially in the circumferential direction thereof.

Advantageously, in this case the plastic parisons are conveyed at least in sections rectilinearly and/or at least in sections along a curved path and in particular a circular curved path. The heat shielding elements are also advantageously moved with respect to one another. In this case particularly these heat shielding elements are arranged on the transport device or transporter and are also moved towards one another or away from one another in a planar by the transport device or transporter itself. In this case it is possible that heat shielding elements which are adjacent to one another in the rectilinear portion have a minimal spacing relative to one another and in the curved portion at least at times have a maximum spacing.

Advantageously, shielding elements which are adjacent to one another move towards one another or away from one another in the manner of a pincer movement. In further advantageous embodiments, the plastic parisons are introduced between two adjacent heat shielding elements by a movement in a direction which is perpendicular to the longitudinal direction of the plastic parisons. Again, the removal of the plastic parisons takes place by a corresponding movement perpendicular to the longitudinal direction of the plastic parisons.

BRIEF DESCRIPTION

Some of the embodiments will be described in detail, with reference to the following figures, wherein like designations denote like members, wherein.

DETAILED DESCRIPTION

Figure 1:
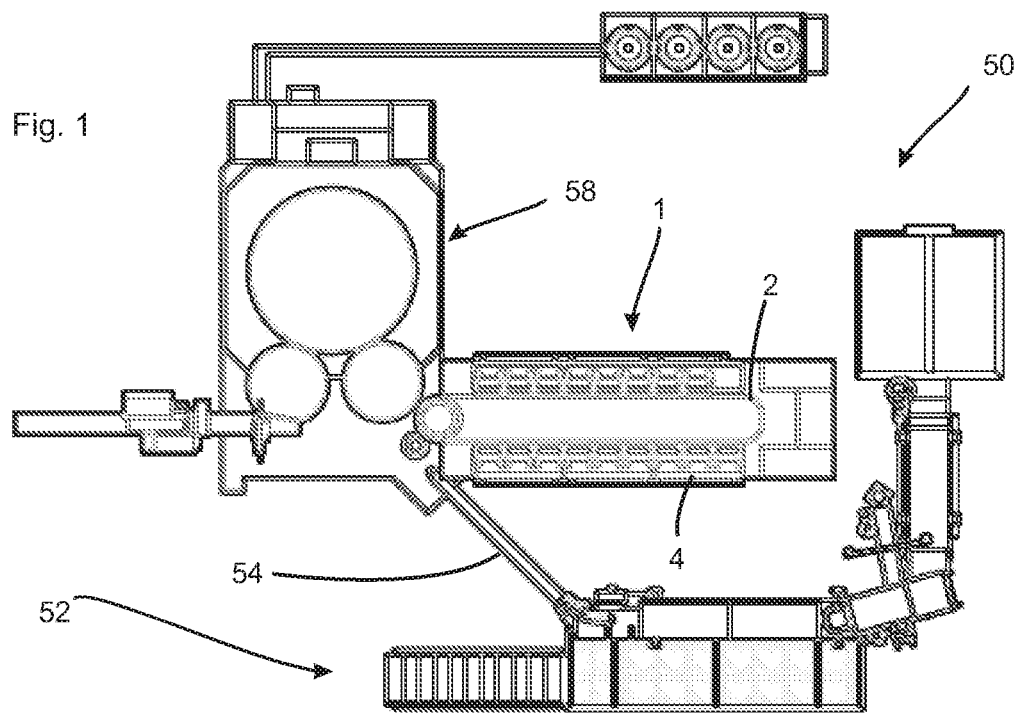
FIG. 1 shows a schematic representation of a plant for producing plastic containers.

FIG. 1 shows a schematic representation of a system 50 for producing plastic containers. In this case plastic parisons are first of all fed from a storage device 52 by means of a transport device or transporter 54 to a heating apparatus 1. In this case this heating apparatus 1 has a transport device or transporter designated by 2 for transporting the plastic parisons as well as at least one heating device 4 which heats these plastic parisons while they are being transported by the transport device or transporter 2. A transforming device 58, such as for example a blow moulding machine, is provided downstream of the heating apparatus 1. This transforms the heated plastic parisons into plastic containers, in particular plastic bottles.

Figure 2:
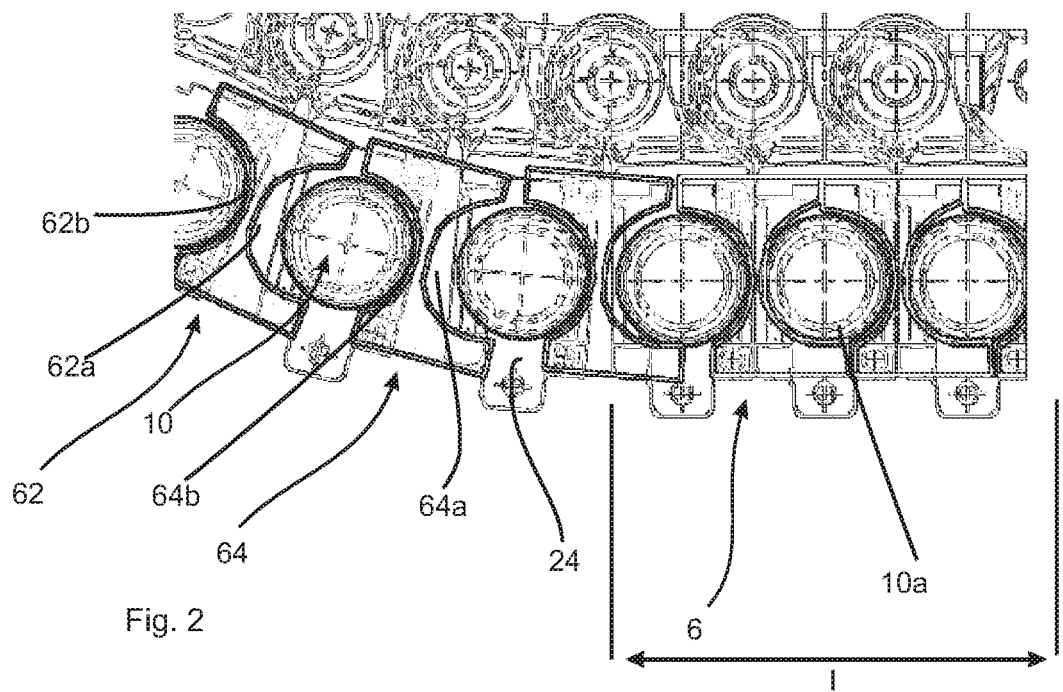
FIG. 2 shows a view of a detail of a transport device or transporter for transporting plastic parisons.

FIG. 2 shows a detail of the transport device or transporter 2. In this case a plurality of shielding elements 62, 64 are provided. It will be recognised that these shielding elements 62, 64 in each case serve for shielding a mouth region 10a of the individual plastic parisons 10. In this case the shielding elements 62, 64 are arranged on chain links and are designed so that they abut one another in a portion I of the transport device or transporter at least during rectilinear transport.

In this way it is, on the one hand, possible in a deflection region of the transport device or transporter to introduce the plastic parisons into an intermediate space between two adjacent holding elements and, on the other hand, they can advantageously be closed on the rectilinear path. Furthermore, it will be recognised that the shielding element 62 has a first recess 62a and also a second recess 62b. Likewise it will be recognised that also the shielding element 64 has a first recess 64a and a second recess 64b.

The reference numeral 6 designates the shielding device as a whole, that is to say here the totality of all the individual shielding elements. In a closed state, that is to say in particular during the rectilinear transport, the recess 62a of the shielding element 62 as well as the recess 64b of the following shielding element 64 serve in order to surround the plastic parison in the circumferential direction thereof. In this way it is possible for the shielding elements to form a smaller cross-section than, for example, the carrying ring of the plastic parison.

Figure 3A:
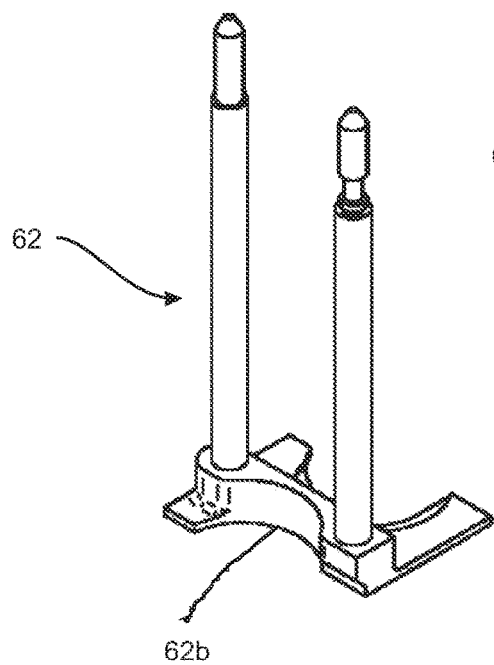
FIG. 3a shows a first representation of a shielding element or shield.
Figure 3B:
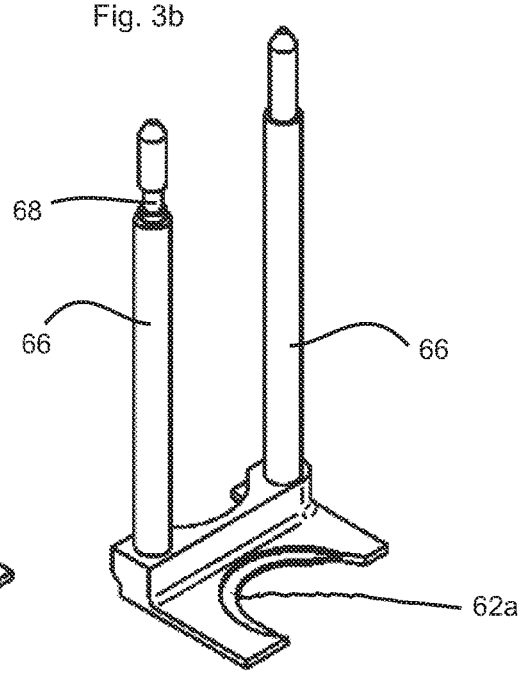
FIG. 3b shows a second representation of a shielding element or shield.

FIGS. 3a and 3b show two representations of shielding elements 62. In particular the recess 62b as well as the recess 62a located opposite can be seen here. The reference numerals 66 designate carrier devices by which the shielding element can be fastened to a holding device. The reference numeral 68 designates a recess for securing the shielding elements on a holding device. In this way, a quick change of the holding elements is possible. Due to the configurations or the two-part configuration of the shielding elements it is possible that during the transport operation the holding elements are inserted below the carrying ring. In this case it is possible that a very large circumferential angle of the plastic parison is shielded directly by the shielding element. In experiments it was possible to show that for the subsequent blow moulding machine an imprint of the blow nozzle is considerably reduced. The shielding elements described here also allow a more favourable neck extension after the heating process and also more process freedom because of a reduced heating of the mouths of the plastic parisons.

Figure 4A:
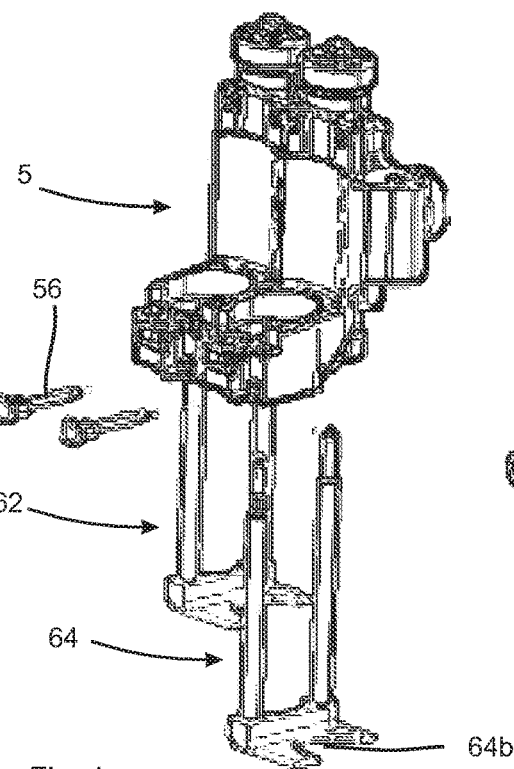
FIG. 4a shows a representation of shielding elements or shields installed on holding devices or holders.
Figure 4B:
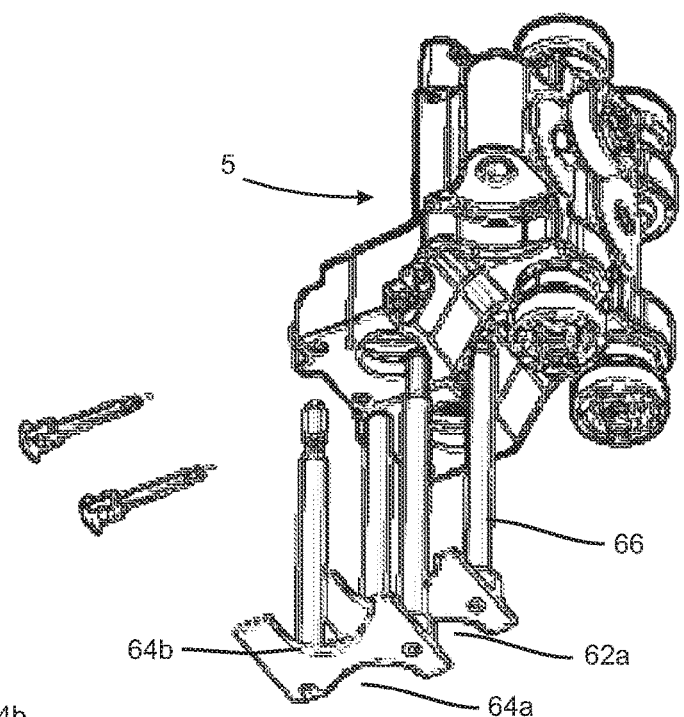
FIG. 4b shows another representation of shielding elements or shields installed on holding devices or holders.

FIGS. 4a and 4b show a composition of a holding arrangement 5 on which a shielding element 62 is arranged. It will be recognised that the shielding elements 62 are insertion elements, which can be inserted into regions of the holding device 5. The reference numerals 56 designate fastening means or fastener(s), as for instance screws or the like, which serve for holding of the shielding elements 62. This holding arrangement also has the individual holding devices or holders (not shown) for holding the plastic parisons. In this case this holding arrangement can be arranged on a transport chain which serves for transporting the plastic parisons.

Figure 5:
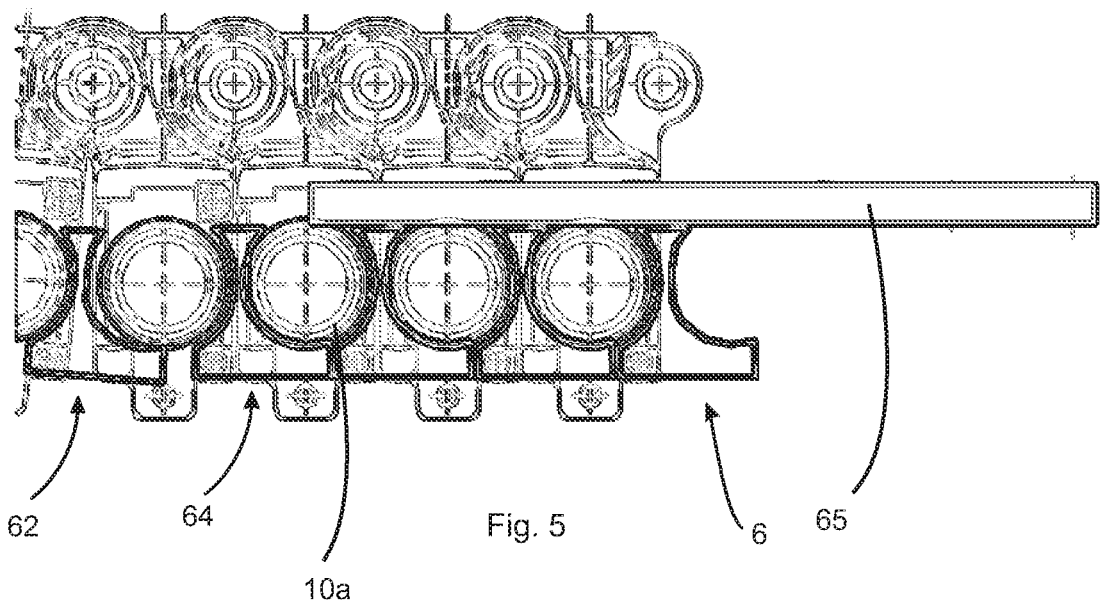
FIG. 5 shows a further view of an apparatus according to embodiments of the invention.

FIG. 5 shows a further representation of an apparatus according to embodiments of the invention. It will be recognised here that the successive shielding elements 62 and 64 still do not completely surround the plastic parisons, but a certain angular region remains empty or unshielded. In this embodiment a further shielding element 65 is provided, which here is in the form of an elongate plate and which covers the remaining region in the circumferential direction around the plastic parisons. In this case for each plastic parison the shielding device 6 is composed of the two shielding elements 62 and 64 and the aforementioned shielding panel 65. This shielding panel 65 is arranged stationary, that is to say the plastic parisons move relative to this shielding panel. On the other hand, the shielding elements 62 and 64 move with the plastic parisons and thus particularly are also arranged on the transport device or transporter 2, that is to say the transport chain. At least during the transport of the plastic parisons in a rectilinear section, the shielding elements are arranged stationary relative to the plastic parisons.

Figure 6:
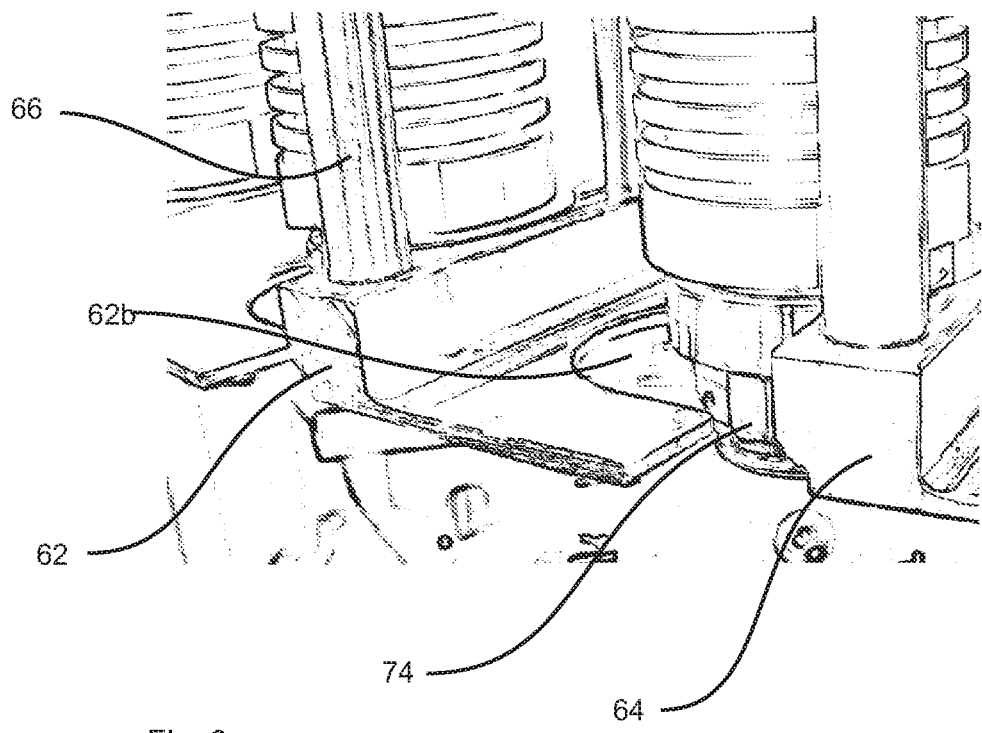
FIG. 6 shows a representation to illustrate the shielding elements.

FIG. 6 shows a further representation of the apparatus according to embodiments of the invention. In addition to the recesses 62b and the shielding elements 62 and 64, this representation also shows the gripping element 74 which engages in the plastic parisons in order to hold them. This gripping element is formed here as a mandrel (not shown) which can be introduced into the mouths of the plastic parisons. In addition, the carrier 66 can also be seen, by means of which the shielding elements are fastened to their holding device. These gripping elements are therefore the above-mentioned holding devices or holders for holding the plastic parisons.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES 1 heating apparatus
2 transport device or transporter for transporting the plastic parisons
4 heating device
5 holding device
6 shielding device
10 plastic parisons
10a mouth region of the plastic parison 10
50 system for producing plastic containers
52 storage device
54 transport device or transporter
56 fastening means or fastener
58 transforming device
65 shielding panel
66 carrier devices
68 recess for securing the shielding elements
74 gripping element
62, 64 shielding elements
62a first recess
62b second recess
64a first recess
64b second recess
66 carrier
74 gripping element, holding device
I section of the transport device or transporter

The invention claimed is:

1. An apparatus for heating plastic parisons, comprising a transporter, which transports the plastic parisons at least at sections along a predefined transport path, wherein the transporter has a plurality of holders for holding the plastic parisons, with a heater for heating the plastic parisons at least at times, while they are being transported by the transporter, wherein the apparatus has at least one heat shield which is suitable and intended to counteract the heating of mouth regions of the plastic parisons, wherein the at least one heat shield has at least one first heat shielding element and a second heat shielding element which can be moved relative to one another and which, in at least one relative position with respect to one another, at least partially surround a portion of a plastic parison in the circumferential direction thereof and wherein holding devices have mandrels which are introduced into mouths of the plastic parisons, and wherein the at least one first heat shielding element and the second heat shielding element are arranged on a transport chain with a same holding arrangement as the holding devices.

2. The apparatus according to claim 1, wherein the heat shielding elements have a plate-like construction.

3. The apparatus according to claim 1, wherein at least one heat shielding element has a first recess to receive at least one portion of the plastic parison.

4. The apparatus according to claim 3, wherein at least one heat shielding element has a second recess for receiving a portion of the plastic parison.

5. The apparatus according to claim 4, wherein the first recess of the first shielding element and the second recess of the second shielding element are constructed in such a way that they co-operate at least at times in order to substantially surround a portion of a plastic parison in the circumferential direction.

6. The apparatus according to claim 4, wherein in a state in which the recesses surround a plastic parison, an area surrounded by these recesses is smaller than or equal to the cross-section of a carrying ring of this plastic parison.

7. The apparatus according to claim 3, wherein at least one recess is suitable to surround the plastic parison in the direction thereof at an angle which is one of greater than 70°, greater than 90°, greater than 120°, greater than 140°, greater than 150°, greater than 160° and greater than 170° and/or that at least one recess is suitable to surround the plastic parison in the direction thereof at an angle which is one of less than 270°, less than 250°, less than 230°, and less than 210°.

8. The apparatus according to claim 1, wherein the heat shielding elements are made from a reflecting material.

9. The apparatus according to claim 1, wherein the heat shielding elements can be fixed to the holders by means of a quick-change connection.

10. The apparatus according to claim 1, wherein at least one heat shielding element has a first recess to receive a portion of a first plastic parison as well as a second recess to receive a portion of a second plastic parison.

11. The apparatus according to claim 1, wherein at least two heat shielding elements have the same construction.

12. The apparatus according to claim 1, wherein a shielding panel is provided, which is in the form of an elongate plate and covers the remaining region in the circumferential direction around the plastic parisons, so that for each plastic parison the shield is composed of the two shielding elements and the shielding panel.

13. The apparatus according to claim 12, wherein the shielding panel is arranged stationary and the shielding elements move with the plastic parisons.

14. The apparatus according to claim 1, wherein both shielding elements can be advanced towards the plastic parisons by a movement which takes place perpendicularly to a longitudinal axis of the plastic parison.

15. An apparatus for heating plastic parisons, comprising a transporter, which transports the plastic parisons at least at sections along a predefined transport path, wherein the transporter has a plurality of holders for holding the plastic parisons, with a heater for heating the plastic parisons at least at times, while they are being transported by the transporter, wherein the apparatus has at least one heat shield which is suitable and intended to counteract the heating of mouth regions of the plastic parisons, wherein the at least one heat shield has at least one first heat shielding element and a second heat shielding element which can be moved relative to one another and which, in at least one relative position with respect to one another, at least partially surround a portion of a plastic parison in the circumferential direction thereof and wherein the holding devices have mandrels which are introduced into mouths of the plastic parisons, and wherein the mandrels are rotatable, so that during the heating of the plastic parisons a rotation thereof with respect to their longitudinal direction is carried out.

16. A method for heating plastic parisons wherein the plastic parisons are transported by a transporter along a predetermined transport path and are heated at least at times during this transport, wherein a heating of mouth regions of the plastic parisons is counteracted by a heat shield, wherein the heat shield in each case has a first heat shielding element and a second heat shielding element which can be moved relative to one another and which, in at least one relative position with respect to one another, at least partially surround a portion of the plastic parison in the circumferential direction thereof and wherein holding devices have mandrels which are introduced into mouths of the plastic parisons, and wherein the first heat shielding element and the second heat shielding element are arranged on a transport chain with a same holding arrangement as the holding devices.

* * * * *